Patented July 31, 1934

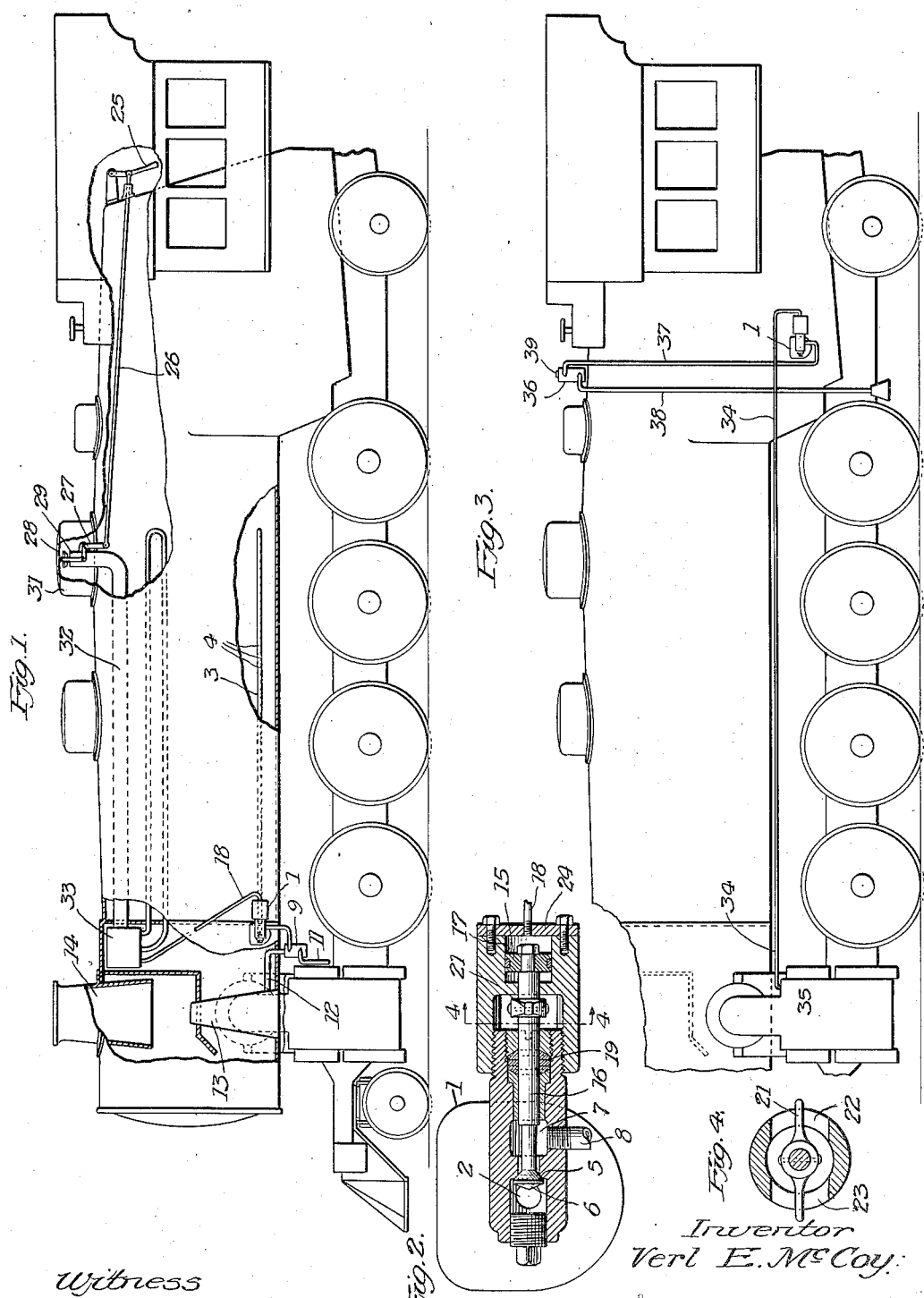

1,968,651

UNITED STATES PATENT OFFICE 1,968,651

CONTINUOUS SLUDGE REMOVAL METHOD AND APPARATUS

Verl E. McCoy, Chicago, Ill., assignor to Wilson Engineering Corporation, Chicago, Ill., a corporation of Delaware Application August 6, 1931, Serial No. 555,412

3 Claims. (Cl. 122—382)

This invention pertains to apparatus for the removal, from locomotive boilers, of dissolved solids and suspended matter commonly referred to as sludge. Heretofore the usual practice has been to blow off the sludge to the atmosphere at intervals whenever in the opinion of the engine crew it was deemed that there was a sufficient accumulation of sludge warranting such blowing off, provided however that at the time the blowing off operation could be safely performed. This invention aims particularly to provide apparatus which permits of the continuous discharge of sludge during the operation of the locomotive.

Normally, while a locomotive is being propelled, feed water is being continuously fed into it, consequently foreign substances, constituting the impurities in the water which must be discharged and are called "sludge" are therefore being continuously introduced into the locomotive boiler in small quantities. It is apparent therefore, that if the same amount of sludge be continuously discharged from the locomotive, the concentration of impurities in the boiler water may be prevented from increasing. For example, if the feed water contains ten grains of solids per gallon and fifty gallons per minute of water are being fed into the boiler, five hundred grains of solids are being added per minute. If the concentration of solids in the boiler is about two hundred fifty grains per gallon and the boiler may be safely operated so long as the concentration does not increase to greater than two hundred fifty grains per gallon the boiler water will be maintained continuously in a proper condition if there be discharged continuously from the boiler two gallons of sludge per minute. These two gallons of sludge will contain five hundred grains of solids which is the same amount as is being added per minute in the feed water. These figures which are submitted merely to illustrate the theory of operation of this invention are of course not intended to indicate the practical or desirable limits of the introduction of solids or withdrawal of solids.

The general object of this invention is to provide improved apparatus for sludge discharge from locomotives. Particular objects and advantages of the invention will become apparent from a perusal of the specification.

In the drawing,

Fig. 1 is a side elevation of a locomotive partly in section equipped in accordance with this invention;

Fig. 2 is a longitudinal sectional view of the sludge discharge valve provided as a part of this invention;

Fig. 3 is a side elevation of a locomotive showing a somewhat different application of the invention; and Fig. 4 is a vertical sectional view taken on the line 4—4 of Fig. 2.

Referring now to Figs. 1 and 2, the sludge discharge valve herein shown is connected to the lower portion of the boiler by means of an attaching plate 1 having a port 2 communicating with the interior of the boiler and preferably with a sludge collecting pipe 3 lying near the bottom of the barrel of the boiler, the pipe having a plurality of apertures 4 on its under side for admitting sludge into the pipe.

The valve is preferably mounted on the outside of the boiler and is provided with a valve seat 5 which is normally closed by the valve 6, which prevents, when closed, communication between the valve inlet 2 and the valve outlet chamber 7. Connected with the valve chamber 7 is a pipe 8 which is preferably connected with a separator 9 of the centrifugal type which is constructed to separate by centrifugal action steam from the sludge water and to enable the sludge water to be discharged through the pipe 11 either to the ground or to some other place of discharge while the separated steam escapes through a pipe 12 into the steam exhaust duct 13 leading to the locomotive stack 14.

It is apparent that the valve 6 will normally be held closed by the internal boiler pressure acting on its inner face. For opening this valve, a piston 15 is secured to the valve stem 16 within a cylinder 17 and steam is introduced through the pipe 18 for acting on the piston to push the valve 6 off its seat. It will be obvious that the outer face of the piston 15 has a greater area than the head of the valve, consequently the steam pressure afforded by the boiler pressure may be used for opening the valve. Suitable packing 19 is of course provided about the valve stem and a rocking bar 21 is secured to the valve stem and extends through opposite apertures 22 and 23 in the valve structure so that the engine crew may grasp the rocking bar to rotate the blow off valve slightly on its seat for dislodging or breaking any scale which may have accidentally lodged on the valve seat. The outer end of the cylinder 17 is sealed by a plate 24.

The steam for opening the valve by action of the piston 15 is supplied preferably whenever the throttle valve is open and the supply is maintained so long as the throttle valve is open so that the sludge valve will remain open and permit a continuous sludge discharge. In Fig. 1 this throttle valve and throttle are diagrammatically illustrated, consisting of the throttle 25, the rod 26, the bell crank 27, the valve 28 and valve seat 29, the latter being located in the steam dome 31. When the throttle valve is open steam will enter from the dome past the open valve seat 29 into the pipe 32, thence preferably to the superheater header 33, thence through the pipe 18 to the valve operating cylinder 17. The connection from the superheater header to the locomotive cylinder is not shown as it is not a part of this invention and is therefore omitted to simplify the drawing.

The apparatus operates as follows. Upon the opening of the throttle valve 28 by means of the throttle 25, steam will be admitted from the locomotive boiler into the superheater through the pipe 18 to the valve operating cylinder 17, forcing the piston 15 to the left as viewed in Fig. 2 and opening the sludge discharge valve. The sludge will then flow through the collecting pipe 3, out through the pipe 8 to the separator 9 and the centrifugally separated steam will be discharged directly or indirectly out through the locomotive stack. The centrifugal separation is calculated to relieve the sludge water of pressure, so that the latter may fall harmlessly with little force to the ground. So long as the throttle valve is open and the engine is being propelled, feed water normally is being supplied to the boiler introducing its usual amount of solids, but the concentration of solids in the boiler water is prevented from increasing at least to a harmful extent by the continuous discharge of sludge in the manner just explained. As soon as the throttle valve is closed the cessation of pressure in the superheater header will then relieve the pressure in the valve separating cylinders and the internal boiler pressure closes the sludge valve.

The modified form shown in Fig. 3 is constructed as follows. The sludge discharge valve itself is the same as shown in Figs. 1 and 2, having its attaching plate 1 secured to the boiler in the position indicated where it will draw sludge from the rear instead of the front of the boiler. However, the pipe 34 which supplies steam to open this valve is connected to the steam cylinders 35 to receive steam therefrom whenever the throttle valve (not shown) is open. Of course, the pipe 34 could obviously be connected directly to the superheater header. In the modification shown in Fig. 3, instead of mounting the separator near the forward end of the locomotive, in this instance a separator 36 is mounted on top of the boiler and connected by a pipe 37 to the outlet chamber of the sludge blow off valve. This separator also centrifugally effects separation of the steam and sludge and discharges the sludge water to the pipe 38 down to the ground, relieved of the boiler pressure by reason of the previous separation of the steam. The separator 36 discharges its steam directly to the atmosphere through a top opening 39. The arrangement of the sludge removal apparatus shown in Fig. 3 does not differ in principle however from that of Fig. 1 and operates therefore in the same manner, continuously discharging sludge whenever the throttle valve is open and ceasing to discharge sludge as soon as the throttle valve closes.

It should be understood that the principles of this invention may be utilized in various embodiments which may differ from those herein disclosed, while remaining nevertheless within the spirit and scope of this invention.

Having shown and described my invention, I claim:

1. A method of removing sludge from locomotive boilers comprising discharging concentrated sludge from the bottom of the boiler simultaneously with the supplying of steam to the locomotive cylinders and maintaining said discharge at a rate calculated to so remove from the locomotive substantially the same quantity of sludge forming impurities as are injected therein in the feed water during propulsion of the locomotive, separating the discharged sludge into steam and into liquid with the latter substantially at atmospheric pressure, directing the liquid discharge to the roadway with harmless force and beneath the locomotive and discharging the separated steam upwardly, avoiding sidewise steam discharge which might endanger life or property at the roadside.

2. In combination with a locomotive, a sludge discharge valve connected thereto, a sludge collecting pipe in the bottom of the boiler connected to said valve, means utilizing a portion of the steam released from the boiler for delivery to the locomotive cylinders for opening said valve, means constructed for separating the major portion of the steam from the sludge discharge to relieve pressure from the liquid portions of said sludge, means for conducting the separated liquid sludge and arranged to discharge it with harmless force to the ground below the locomotive, and means for discharging the separated steam into the locomotive stack.

3. In combination with a locomotive, a sludge discharge valve connected thereto, a sludge collecting pipe in the bottom of the boiler connected to said valve, means utilizing a portion of the steam released from the boiler for delivery to the locomotive cylinders for opening said valve, means constructed for separating the major portion of the steam from the sludge discharge to relieve pressure from the liquid portions of said sludge, means for conducting the separated liquid sludge and arranged to discharge it with harmless force to the ground below the locomotive, and means for discharging the separated steam separately from the sludge at a point and in a direction where it will not strike the roadbed or be discharged toward the roadside.

VERL E. McCOY.